US010557233B2

(12) United States Patent
Lehtinen et al.

(10) Patent No.: US 10,557,233 B2
(45) Date of Patent: Feb. 11, 2020

(54) METHOD FOR MANUFACTURING A HOISTING ROPE, HOISTING ROPE AND ELEVATOR USING THE SAME

(71) Applicants: Hannu Lehtinen, Numminen (FI); Riku Lampinen, Helsinki (FI)

(72) Inventors: Hannu Lehtinen, Numminen (FI); Riku Lampinen, Helsinki (FI)

(73) Assignee: Kone Corporation, Helsinki (FI)

( * ) Notice: Subject to any disclaimer, the term of this patent is extended or adjusted under 35 U.S.C. 154(b) by 169 days.

(21) Appl. No.: 15/441,428

(22) Filed: Feb. 24, 2017

(65) Prior Publication Data

US 2017/0159236 A1    Jun. 8, 2017

Related U.S. Application Data

(63) Continuation of application No. PCT/EP2015/073905, filed on Oct. 15, 2015.

(30) Foreign Application Priority Data

Oct. 16, 2014   (EP) .................................... 14189182

(51) Int. Cl.
*B05D 3/14*   (2006.01)
*D07B 1/16*   (2006.01)
(Continued)

(52) U.S. Cl.
CPC .................. *D07B 1/16* (2013.01); *B05D 1/26* (2013.01); *B05D 1/265* (2013.01); *B05D 3/142* (2013.01);
(Continued)

(58) Field of Classification Search
CPC .......... B05D 1/26; B05D 1/265; B05D 3/142; B05D 3/144; D07B 1/16; D07B 1/167;
(Continued)

(56) References Cited

U.S. PATENT DOCUMENTS 3,616,496 A * 11/1971 Anglioletti .............. B29C 70/20
425/113
5,922,281 A * 7/1999 Elgas ................... A61M 1/1698
261/DIG. 28
(Continued)

FOREIGN PATENT DOCUMENTS

WO   WO-2006001702 A1 * 1/2006 ............... E04C 5/07
WO   WO-2006/085881 A1   8/2006
(Continued)

OTHER PUBLICATIONS

International Search Report PCT/ISA/210 for International Application No. PCT/EP2015/073905 dated Jan. 20, 2016.
(Continued)

*Primary Examiner* — Marianne L Padgett
(74) *Attorney, Agent, or Firm* — Harness, Dickey & Pierce, P.L.C.

(57) ABSTRACT

The invention relates to a method for manufacturing a hoisting rope, comprising the steps of
  providing a plurality of elongated composite members, which composite members are made of composite material comprising reinforcing fibers in polymer matrix; and
  arranging the composite members to form an elongated row of parallel composite members, which row has a longitudingal direction, a thickness direction and a width direction, and in which row the composite members are positioned side by side such that they are parallel to each other, and spaced apart from each other in width direction of the row; and
  directing plasma treatment on the outer surface of the composite members; and
  embedding the composite members in fluid polymer material; and
(Continued)

solidifying the polymer material wherein the composite members are embedded. The invention relates also to a hoisting rope obtained with the method and an elevator comprising the hoisting rope.

17 Claims, 5 Drawing Sheets

(51) Int. Cl.
*D07B 1/22* (2006.01)
*D07B 7/14* (2006.01)
*B29C 59/14* (2006.01)
*B05D 1/26* (2006.01)
*B29C 70/20* (2006.01)
*B29C 59/10* (2006.01)
*B29C 59/00* (2006.01)
*B29L 31/00* (2006.01)

(52) U.S. Cl.
CPC ............ *B05D 3/144* (2013.01); *B29C 59/005* (2013.01); *B29C 59/103* (2013.01); *B29C 59/142* (2013.01); *B29C 70/20* (2013.01); *B29C 70/207* (2013.01); *D07B 1/22* (2013.01); *D07B 7/145* (2013.01); *B29L 2031/707* (2013.01); *D07B 2201/1092* (2013.01); *D07B 2201/2033* (2013.01); *D07B 2201/2046* (2013.01); *D07B 2201/2071* (2013.01); *D07B 2201/2087* (2013.01); *D07B 2205/2003* (2013.01); *D07B 2205/206* (2013.01); *D07B 2205/2064* (2013.01); *D07B 2205/3003* (2013.01); *D07B 2205/3007* (2013.01); *D07B 2401/2095* (2013.01); *D07B 2501/2007* (2013.01); *D07B 2501/2015* (2013.01)

(58) Field of Classification Search
CPC .. D07B 1/22; D07B 7/145; D07B 2201/1092; D07B 2201/2003; D07B 2201/2016; D07B 2201/2018; D07B 2201/2033; D07B 2201/2087; D07B 2401/2095; D07B 2501/2007; B29C 59/103; B29C 59/142; B29C 70/20

USPC .................. 427/491, 535, 536, 538, 539
See application file for complete search history.

(56) References Cited

U.S. PATENT DOCUMENTS

| | | | |
|---|---|---|---|
| 9,944,494 B2 * | 4/2018 | Alasentie | B66B 7/064 |
| 2002/0150752 A1 * | 10/2002 | Debalme | B29B 15/122 |
| | | | 428/343 |
| 2003/0000619 A1 * | 1/2003 | Nakamura | B60C 9/0064 |
| | | | 152/525 |
| 2008/0156592 A1 | 7/2008 | Thompson et al. | |
| 2010/0032081 A1 * | 2/2010 | Green | B29C 47/0014 |
| | | | 156/219 |
| 2011/0000746 A1 | 1/2011 | Pelto-Huikko et al. | |
| 2011/0108371 A1 | 5/2011 | Thompson et al. | |
| 2011/0266097 A1 | 11/2011 | Valjus et al. | |
| 2012/0160082 A1 | 6/2012 | Erlendsson | |
| 2014/0305744 A1 * | 10/2014 | Kere | B66B 7/1238 |
| | | | 187/254 |
| 2014/0311323 A1 | 10/2014 | Erlendsson | |
| 2014/0345978 A1 * | 11/2014 | Alasentie | B66B 7/064 |
| | | | 187/254 |
| 2016/0016757 A1 * | 1/2016 | Honkanen | B66B 7/062 |
| | | | 156/166 |

FOREIGN PATENT DOCUMENTS

| | | | | |
|---|---|---|---|---|
| WO | WO-2009/090299 A1 | | 7/2009 | |
| WO | WO-2013/072941 A2 | | 5/2013 | |
| WO | WO-2013110853 A1 | * | 8/2013 | ........... B66B 7/1238 |
| WO | WO-2013140038 A1 | * | 9/2013 | ............ B66B 7/064 |
| WO | WO-2014/140424 A1 | | 9/2014 | |

OTHER PUBLICATIONS

Written Opinion of the International Searching Authority PCT/ISA/237 for International Application No. PCT/EP2015/073905 dated Jan. 20, 2016.
European Search Report, Application # EP 14189182 dated Mar. 16, 2015.
Chinese Office Action dated Oct. 8, 2018 in corresponding Chinese Patent Application No. 201580056387.5.

* cited by examiner

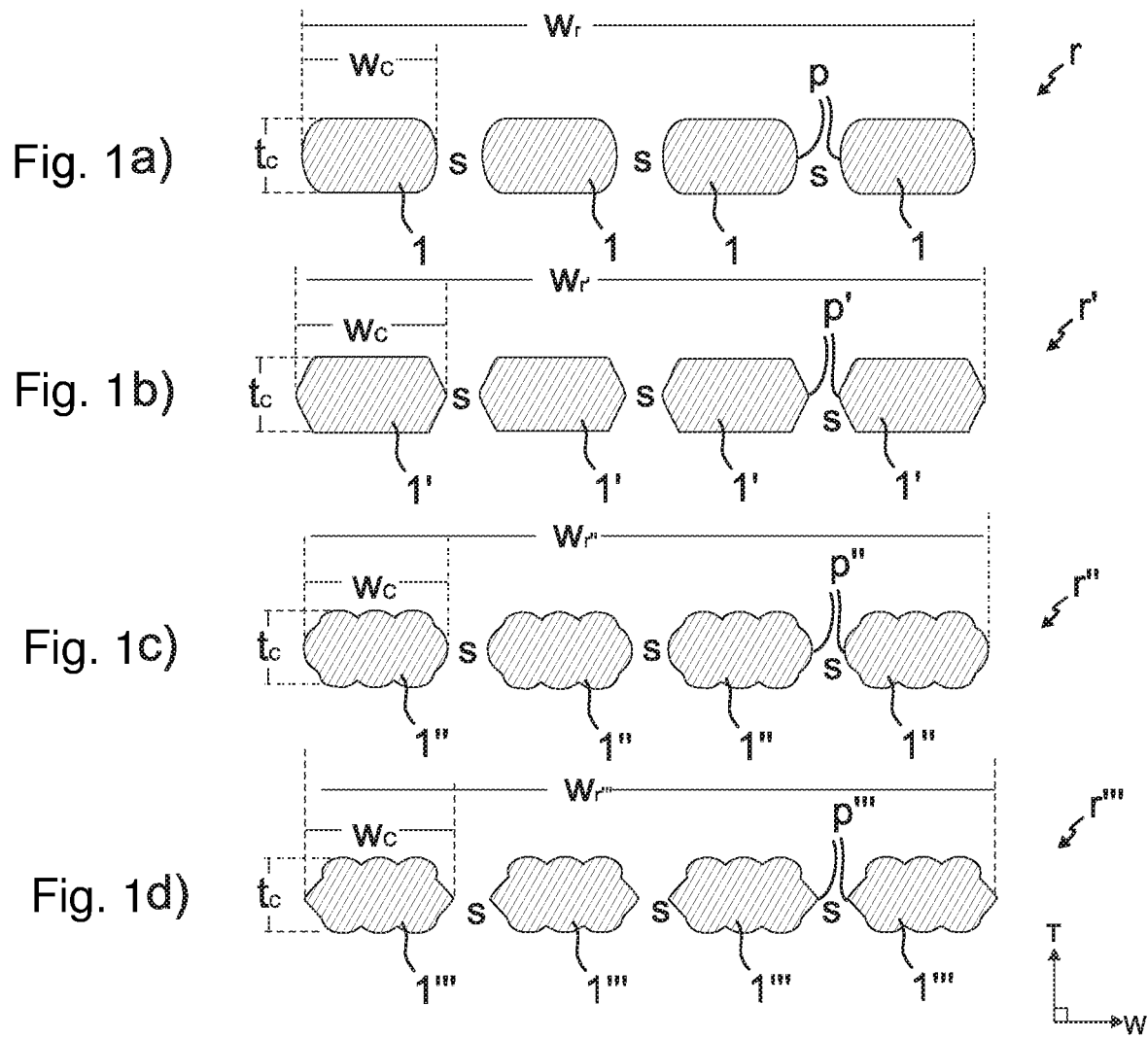
Fig. 1a)
Fig. 1b)
Fig. 1c)
Fig. 1d)
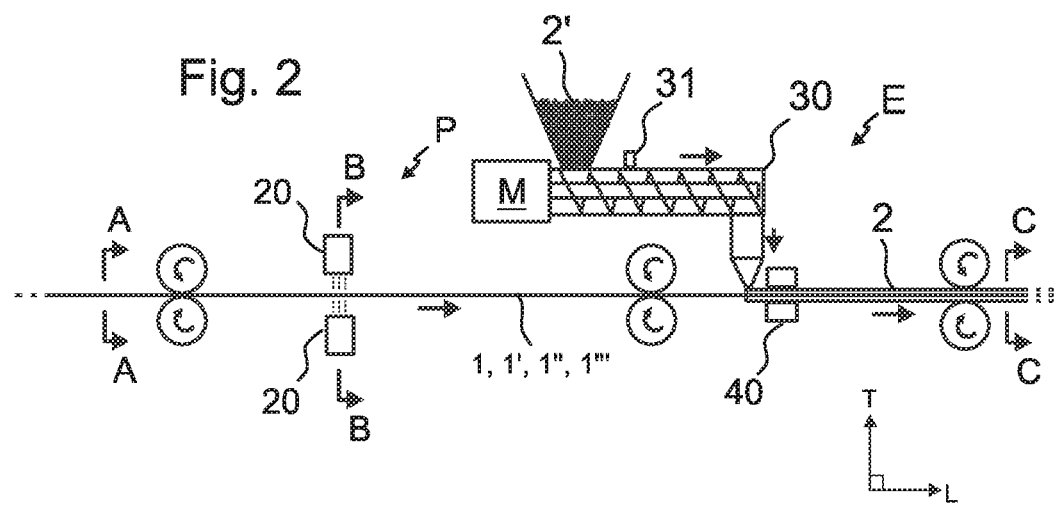
Fig. 2

Fig. 7
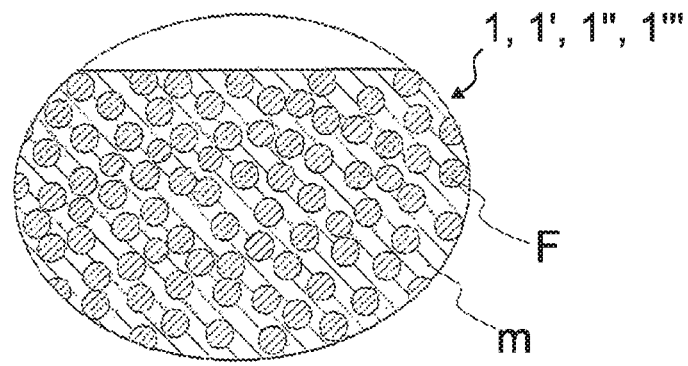
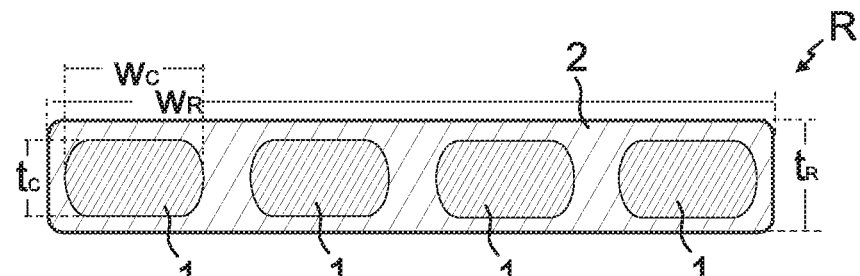
Fig. 8a)
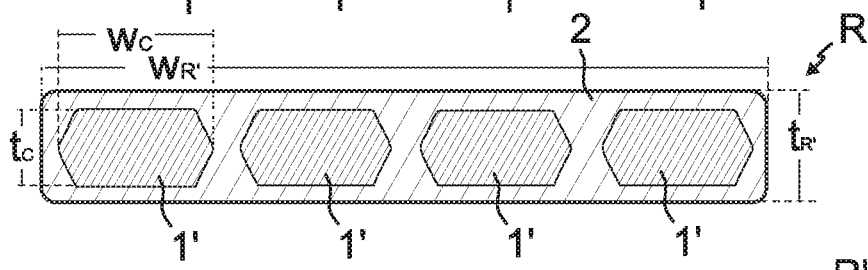
Fig. 8b)
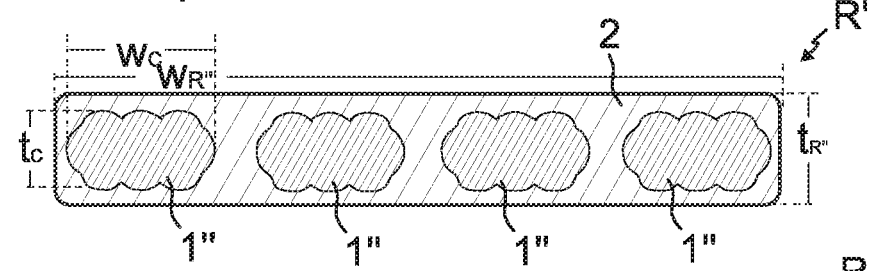
Fig. 8c)
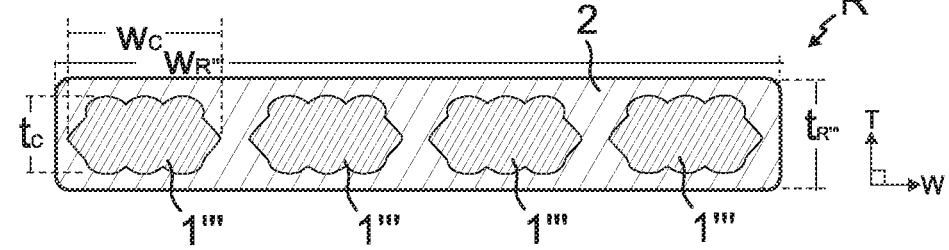
Fig. 8d)

METHOD FOR MANUFACTURING A HOISTING ROPE, HOISTING ROPE AND ELEVATOR USING THE SAME

FIELD OF THE INVENTION

This application is a continuation of PCT International Application No. PCT/EP2015/073905 which has an International filing date of Oct. 15, 2015, and which claims priority to European patent application number 14189182.0 filed Oct. 16, 2014, the entire contents of each of which are incorporated herein by reference.

The invention relates to a method for manufacturing a hoisting rope, a hoisting rope and a hoisting apparatus. Said hoisting apparatus is preferably an elevator for transporting passengers and/or goods.

BACKGROUND OF THE INVENTION

Hoisting ropes typically include one or several load bearing members that are elongated in the longitudinal direction of the rope and each form a structure that continues unbroken throughout the length of the rope. Load bearing members are the members of the rope which are able to bear together the load exerted on the rope in its longitudinal direction. The load, such as a weight suspended by the rope, causes tension on the load bearing member in the longitudinal direction of the rope, which tension can be transmitted by the load bearing member in question all the way from one end of the rope to the other end of the rope. Ropes may further comprise non-bearing components, such as an elastic coating, which cannot transmit tension in the above described way.

In prior art, such hoisting ropes exist where the load bearing members are embedded in polymer coating. Furthermore, such solutions exist where said load bearing members are in the form of elongated composite members made of composite material comprising reinforcing fibers in polymer matrix. In these solutions, the grip between the coating and the composite members has been firm when the coating has been molded around the composite members. The grip hereby achieved has been adequate for enduring, safe and reliable utilization of the rope. It is, however, beneficial if any properties of the grip can be even further improved as in this way force transmission ability and tolerance for abnormalities and wear of the rope can be increased even further.

BRIEF DESCRIPTION OF THE INVENTION

The object of the invention is to introduce a method for manufacturing a hoisting rope, a hoisting rope and a hoisting apparatus which is improved in terms of grip between the coating and the composite members of a hoisting rope. The object of the invention is particularly to introduce a solution where adhesion between the coating and the composite members of a hoisting rope is extremely firm. Advantageous embodiments are presented, inter alia, wherein the coating adheres with substantially even firmness on all surfaces of the composite members. The improvements can be utilized to increase force transmission ability via the grip or to extend life time of the rope, or to increase the tolerance for abnormalities or local wear or to reduce likelihood for rope damage.

It is brought forward a new method for manufacturing a hoisting rope, comprising providing a plurality of elongated composite members, which composite members are made of composite material comprising reinforcing fibers embedded in polymer matrix; and arranging the composite members to form an elongated row of parallel composite members, which row has a longitudingal direction, a thickness direction and a width direction, and in which row the composite members are positioned side by side such that they are parallel to each other and spaced apart from each other in width direction of the row; and thereafter directing plasma treatment on the row, and thereby on the outer surface of the composite members, for modifying the surface properties of the composite members; and thereafter embedding the row and thereby the composite members in fluid polymer material; and thereafter solidifying the polymer material wherein the composite members are embedded. Thus, one or more of the above mentioned objects are achieved.

In a preferred embodiment, in said embedding fluid polymer material, in particular a uniform body thereof, is guided to wet all the composite members. Preferably, said fluid polymer material is guided to wet the entire outer circumference of all the composite members.

In a preferred embodiment, in said embedding fluid polymer material, in particular a uniform body thereof, is guided to surround (in transverse direction) each of said composite members individually and to fill spaces (s) that exist in width direction of the row between adjacent composite members.

In a preferred embodiment, in said embedding fluid polymer material is extruded on the outer surface of the composite members.

In a preferred embodiment, position of the composite members relative to each other is maintained the same after said arranging, i.e. during said embedding, directing and said solidifying.

In a preferred embodiment, the method comprises guiding the composite members, in particular the row of composite members, in the longitudinal direction thereof past one or more plasma treating devices positioned at a stationary location, and in said directing plasma treatment the plasma treating device(s) direct(s) plasma treatment on the composite members.

In a preferred embodiment, the row is substantially larger in its width direction than in its thickness direction.

In a preferred embodiment, in said directing plasma treatment is directed on the composite members from both thickness directional sides of the row.

In a preferred embodiment, the row is guided with continuous movement past a plasma treatment station performing continuously said directing and thereafter past an embedding station performing continuously said embedding.

In a preferred embodiment, possibly all the flanks, but preferably at least the flanks of adjacent composite members, which flanks face each other, are convex shaped. The convex-shape is advantageous, because then the surfaces of the flanks are effectively reached by the plasma treatment. Hereby, it can be facilitated that the composite members of the row can be maintained close to each other during said directing of the plasma treatment. Thus, it can be achieved even that the composite members of the row are at their final position relative to each other even though this means a short distance between them, e.g. less than 5 mm or even less than 3 mm.

In a preferred embodiment, each of the composite members is substantially larger in width direction of the row than in thickness direction of the row. Each composite member has two opposing 'wide' sides facing in thickness direction of the row, and two opposing 'narrow' sides forming flanks of the composite member and facing in width direction of the row. Then, it is preferable that at least the flanks of adjacent composite members facing each other are convex shaped, preferably either V-shaped or arc-shaped. As above mentioned, the convex-shape is advantageous, because then the surfaces of the flanks are effectively reached by the plasma treatment.

In a preferred embodiment, after said arranging, the position of the composite members relative to each other is maintained the same at least during said directing, said embedding and said solidifying, and in said directing plasma treatment is directed on the composite members from both thickness-directional sides of the row, and each of the composite members is substantially larger in width direction of the row than in thickness direction of the row, each composite member having two opposing sides facing in thickness direction of the row, and two opposing sides forming flanks of the composite member and facing in width direction of the row, and at least the flanks of adjacent composite members facing each other are convex shaped, preferably either V-shaped or arc-shaped. With this configuration, the surfaces of the flanks are effectively reached by the plasma treatment yet the distance between adjacent composite members can be maintained short and unchanged during said steps of directing, embedding and solidifying. The method can thus be carried out both simply and effectively. With this configuration, no treatment output from beside the flank is necessary to effectively reach the flanks. Likewise, thus one can avoid the need to orchestrate individual plasma treatment for each composite members at spaced apart locations in order to give adequate treatment for the flanks.

In a preferred embodiment, each said convex shape has a tip pointing in width direction of the composite member/row.

In a preferred embodiment, each said convex shape has tapering form with flanks and a tip connecting the flanks.

In a preferred embodiment, the tip is located centrally in thickness direction of the composite member/row. Thus, it is positioned such that treatment ends up effectively on flanks on both sides of the tip. Plasma treatment can in this case be applied effectively on the composite members from both thickness directional sides of the composite member/the row.

In a preferred embodiment, the tip connects flanks that are inclined towards the tip (in a curved or a straight manner) and the tip is in size not more than ¼ of the thickness of the composite member as measured in thickness direction of the composite member/the row. Most preferably, the tip is formed without flat end surface extending straight in thickness direction of the composite member/the row, or at least with no flat end surface extending in thickness direction that is in size more than ¼ of the thickness of the composite member as measured in said thickness direction.

In a preferred embodiment, the convex shaped flanks are V-shaped.

In a preferred embodiment, the convex shaped flanks are arc-shaped.

In a preferred embodiment, in said embedding the polymer material and the row are forced together into a die, which modifies the outer shape of the polymer material.

In a preferred embodiment, the method comprises prior to said embedding a step of providing the fluid polymer material, said step preferably comprising providing thermoplastic polymer material in solid form, preferably in the form of granules, and thereafter raising the temperature of the solid polymer material such that it gets into fluid form.

In a preferred embodiment, said solidifying comprises cooling off the fluid polymer material.

In a preferred embodiment, the polymer material is thermoplastic polymer material, preferably thermoplastic polyurethane material.

In a preferred embodiment, said plasma treatment is electrical. Preferably, it then comprises ionizing gaseous substance(s) between the plasma treatment device and the composite members and/or accelerating electrons towards (and particularly into) the surfaces of the composite members. Thus, the surface properties of the composite members are modified advantageously in terms of adhesion between the composite members and the polymer material that will be applied thereon.

In a preferred embodiment, the plasma treatment is flame plasma treatment, athmospheric plasma treatment, chemical plasma treatment, RF-plasma treatment or microwave-plasma treatment. The plasma treatment can be in the cathegory of cold plasma treatment or hot plasma treatment, for instance.

In a preferred embodiment, said plasma treatment is corona discharge treatment. Then, said plasma treatment device is a corona discharge device.

In a preferred embodiment, the matrix comprises epoxy.

In a preferred embodiment, the method is a method for manufacturing a hoisting rope, which comprises composite members each of which is elongated in the longitudinal direction of the rope and continues unbroken throughout the length of the rope, said composite members being embedded in solid polymer material, and forming load bearing members of the rope.

In a preferred embodiment, the matrix forms at least part of the outer surface of each composite member, and in said directing plasma treatment is directed on the polymer matrix forming at least part of the outer surface of each composite member. Thereby, the plasma treatment can be directed directly at least on the polymer matrix, and the fluid polymer material can be guided to bond directly at least with the polymer matrix of the composite material. The polymer matrix forms simply and without need for additional components a substrate, which is can effectively be treated with plasma and on which the polymer material can firmly adhere to.

In a preferred embodiment, the opposing faces of the composite members which face in thickness direction of the composite members and the row are uneven, in particular having grooves, and convex shaped portions pointing in thickness direction of the composite members and the row. Uneven surface, and the surface particularly being in this way convex shaped, receives effectively plasma treatment whereby the bonding strength can be maximized.

In a preferred embodiment, the tips of the convex shaped flanks of adjacent composite members facing each other are at a distance of less than 5 mm from each other, more preferably at a distance of less than 3 mm from each other during said directing.

In a preferred embodiment, the composite members are positioned in the row on the same plane.

It is also brought forward a new hoisting rope. The hoisting rope is obtained with the method defined somewhere above or elsewhere in the application such as any one of the method claims.

In a preferred embodiment of the hoisting rope, each of said composite members is elongated in the longitudinal direction of the rope and continues unbroken throughout the length of the rope, said composite members being embedded in solid polymer material, and forming load bearing members of the rope. Said composite members are parallel with each other as well as with the longitudinal rope. Preferably, the polymer material surrounds (in transverse direction) each of said composite members individually and fills spaces that exist in width direction of the row/rope between adjacent composite members, thereby forming a common coating for all of the composite members and isolating these from each other.

It is also brought forward a new elevator, which comprises an elevator car, a hoistway, vertically movable in the hoistway, and one or more hoisting ropes connected with the elevator car. The one or more hoisting ropes are as described above or elsewhere in the application such as any one of the hoisting rope claims.

In a preferred embodiment, the elevator further comprises a counterweight vertically movable in the hoistway, the hoisting rope interconnecting the elevator car and counterweight.

In a preferred embodiment, each of said one or more ropes pass around one or more rope wheels mounted in proximity of the upper end of the hoistway.

In a preferred embodiment, said one or more rope wheels comprise a drive wheel engaging said one or more ropes; and the elevator comprises a motor for rotating the drive wheel, and an elevator control unit for automatically controlling rotation of the motor.

In a preferred embodiment, each of said one or more ropes passes around the one or more rope wheels the side thereof which faces in thickness direction and extends in width direction of the of the rope, resting against the rope wheel.

In a preferred embodiment, each rope is substantially larger in its width direction than in its thickness direction, i.e. it has width larger than thickness thereof.

In a preferred embodiment, each rope passes around the one or more rope wheels turning around an axis extending in width direction of the rope.

In a preferred embodiment, said reinforcing fibers are carbon fibers.

In a preferred embodiment, the reinforcing fibers of each composite member are distributed in polymer matrix and bound together by the matrix. Preferably, the reinforcing fibers of each composite member are substantially evenly distributed in the polymer matrix of the composite member in question.

In a preferred embodiment, said the width/thickness ratio of the rope is more than two, preferably more than 4. Thereby, the bending resistance of the rope is small but the load bearing total cross sectional area can be made vast.

In a preferred embodiment, the width/thickness ratio of each of said composite members is more than 2. Thereby, the bending resistance of the rope is small but the load bearing total cross sectional area is vast with minimal non-bearing areas.

In a preferred embodiment, the module of elasticity (E) of the polymer matrix is over 2 GPa, most preferably over 2.5 GPa, yet more preferably in the range 2.5-10 GPa, most preferably of all in the range 2.5-3.5 GPa. In this way a structure is achieved wherein the matrix essentially supports the reinforcing fibers, in particular from buckling. One advantage, among others, is a longer service life.

In a preferred embodiment, the reinforcing fibers of each composite member are substantially evenly distributed in the polymer matrix of the composite member. Preferably, over 50% of the cross-sectional square area of the composite member consists of said reinforcing fibers. Thereby, a high tensile stiffness can be facilitated. Preferably, the composite members cover together over proportion 50% of the cross-section of the rope.

In a preferred embodiment, the number of said elongated composite members is at least 2, but preferably more than 2, such as 3-10 composite members.

In a preferred embodiment, substantially all the reinforcing fibers of each composite member are parallel with the longitudinal direction of the composite member. Thereby the fibers are also parallel with the longitudinal direction of the row as well as the rope being manufactured as each composite member is oriented parallel with the longitudinal direction of the row as well as the rope being manufactured.

In a preferred embodiment, the reinforcing fibers of each composite member are substantially untwisted in relation to each other.

In a preferred embodiment, the rope is an untwisted rope wherein each of said one or more composite members extend parallel with the longitudinal direction of the rope. In particular, each composite member of the rope extends without twisting around other composite members. Preferably, the position of the composite members relative to each other is similar throughout the length of the rope.

In a preferred embodiment, the rope consists of said plurality of elongated composite members and said polymer material forming a common coating for all of the composite members and isolating these from each other.

The elevator is preferably such that the car thereof is arranged to serve two or more landings. The elevator preferably controls movement of the car in response to calls from landing and/or destination commands from inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which FIGS. 1a to 1d illustrate alternative preferred cross sections of composite members of a row into which they are arranged as seen in longitudinal direction of the composite members and the row.

FIG. 2 illustrates preferred process implementing the method.

FIG. 7 illustrates partially a cross section of a composite member.

FIGS. 8a)-8d) illustrates cross sections of ropes manufactured with the method utilizing rows of composite members as illustrated in FIGS. 1a to 1d.

DETAILED DESCRIPTION

Figure 3:
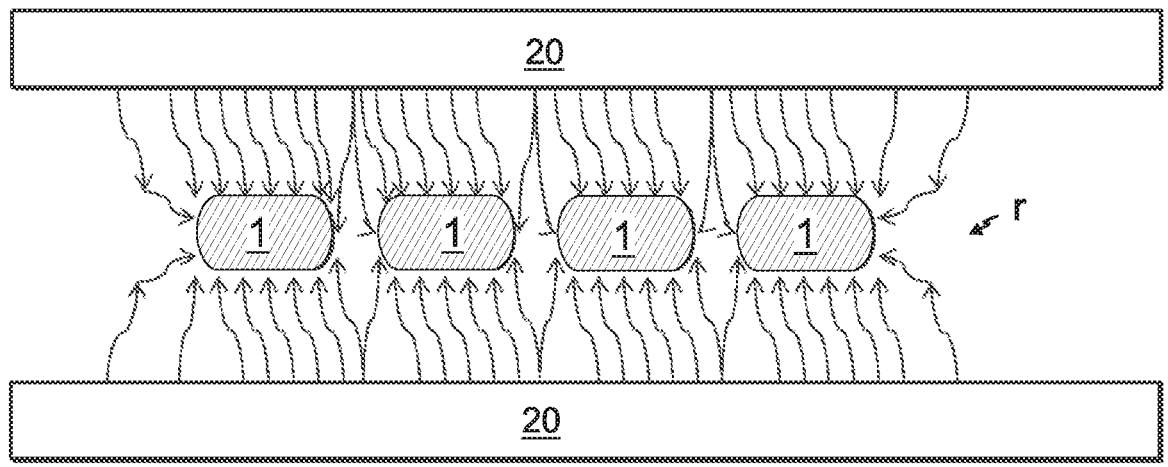
FIGS. 3 to 6 illustrate plasma treatment for the rows of composite members illustrated in FIGS. 1a to 1d.
Figure 4:
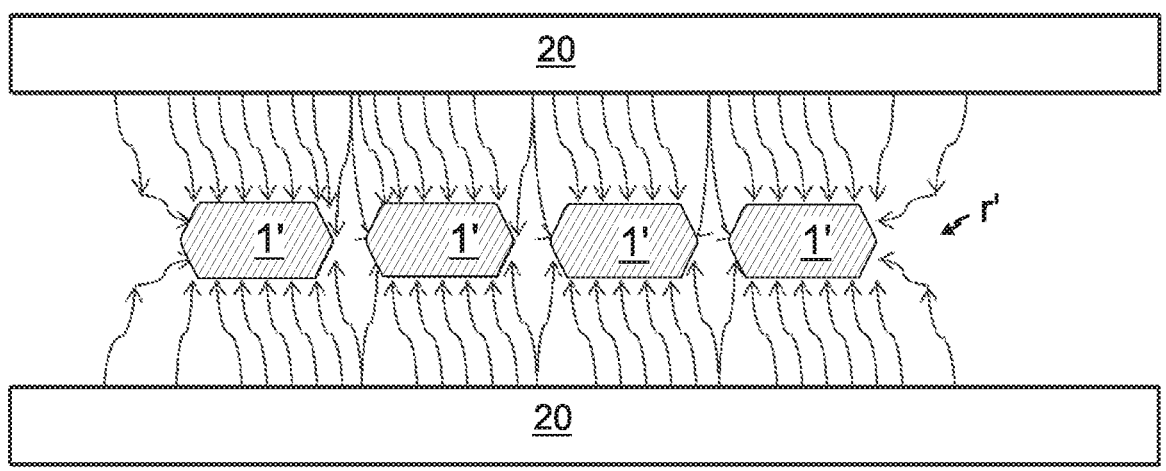
Figure 5:
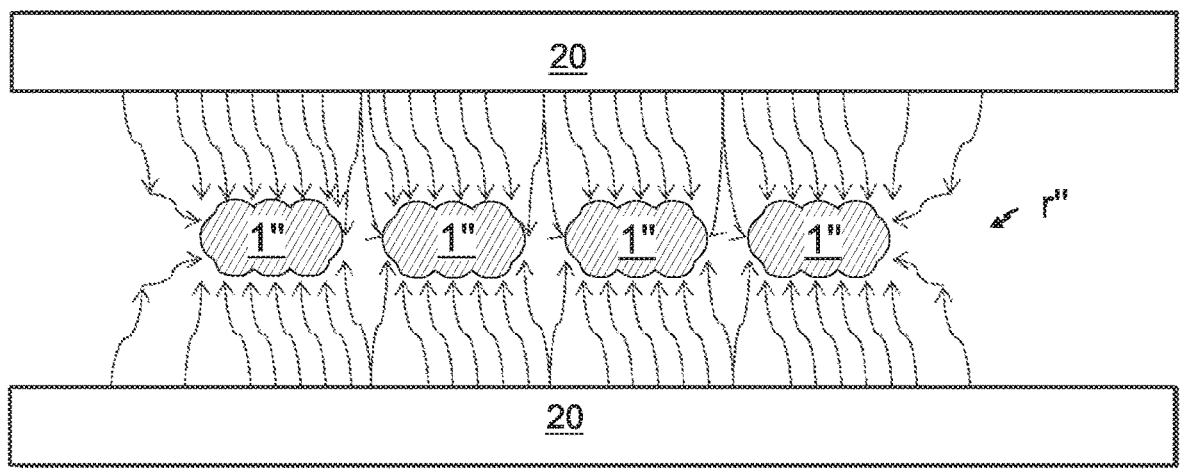
Figure 6:
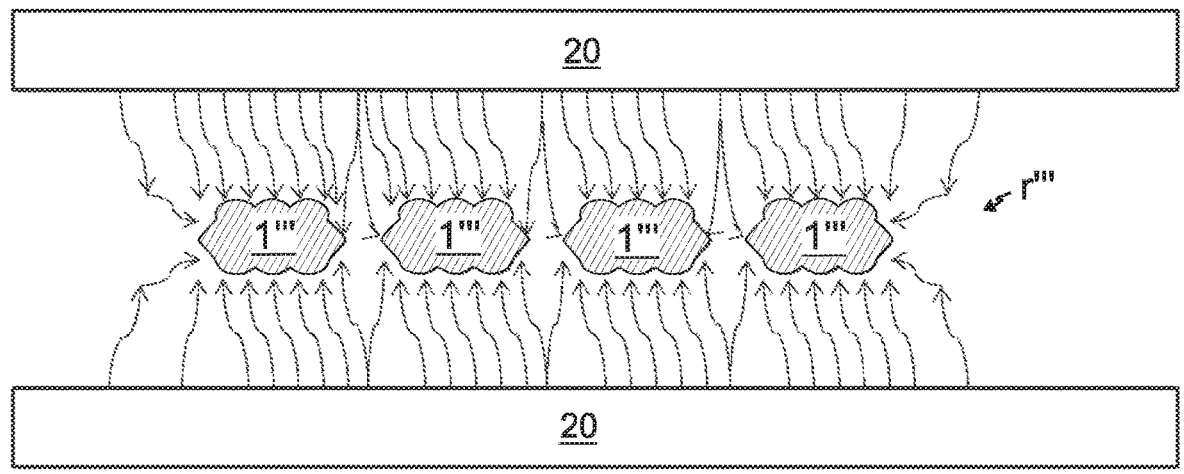

In a preferred embodiment of a method for manufacturing a hoisting rope, a plurality of elongated composite members 1,1',1",1"' are provided, which composite members 1,1',1", 1"' are made of composite material comprising reinforcing fibers f in polymer matrix m. The preferred material and internal structure of the composite members 1,1',1",1"' will be discussed in further detail elsewhere in the application. Said composite members can be manufactured for example in any known way, such as in the manner presented in WO2009090299A1. The composite material of the composite members 1,1',1",1"' may be as defined in WO2009090299A1 as well.

In the method, the composite members 1,1',1",1"' are arranged to form an elongated row r,r',r",r"' of parallel composite members 1,1',1",1"', as illustrated in FIGS. 1a to 1d as viewed in longitudinal direction of the row/composite members.

The elongated row r,r',r",r"' has longitudingal direction L, and a thickness direction T and width direction W. In the elongated row r,r',r",r"', the composite members 1,1',1",1"' are positioned side by side such that they extend in length direction L of the row and are parallel to each other on the same plane and spaced apart from each other in width direction W of the row. FIGS. 1a to 1d illustrate the row r,r',r",r"' with alternative shapes of the composite member 1,1',1",1"'. The composite members are positioned side by side, as defined, in width direction W of the row r,r',r",r"''. The width wr, wr', wr", wr"' of the row r,r',r",r"' is in the illustrated embodiments larger than thickness thereof.

FIG. 2 illustrates processing of the row r,r',r",r"' after said arranging. At the point of section A-A composite members have been arranged to form the elongated row as illustrated in FIG. 1 in longitudinal direction. After arranging the composite members 1,1',1",1"' in this way to form an elongated row, plasma treatment is directed on the row r,r',r",r"' and more particularly on the outer surface of the composite members 1,1',1",1"' for modifying the surface properties of the composite members 1,1',1",1"', in particular for increasing adhesion between the composite members 1,1',1",1"' and a polymer material that will be applied thereon. Particularly, with the plasma treatment, the surface of the composite members 1,1',1",1"' is prepared for more firm bonding with said polymer material that will be applied thereon. In general, the plasma treatment may take the form of any known plasma treatment, for example. As a rule, in plasma treatment the bonding is improved particularly for the reason that plasma treatment increases surface energy of the composite members 1,1',1",1"'. The preferred type(s) of plasma treatment to be used are discussed later in the description.

The composite members 1,1',1",1"', in particular the row r,r',r",r"' of composite members 1,1',1",1"', is guided in the longitudinal direction thereof to be processed by a plasma station P. As illustrated in FIG. 2, the row r,r',r",r"' is guided in the longitudinal direction thereof past plasma treating devices 20 positioned at a stationary locations on opposite sides of the row r,r',r",r"' and continuously directing plasma treatment of the row r,r',r",r"'. In said directing of plasma treatment on the row r,r',r",r"', the plasma treating devices 20 direct plasma treatment on the composite members 1,1',1", 1"' from opposite sides of the row 1,1',1",1"'. After said plasma treatment, the row r,r',r",r"' and thereby each of the composite members 1,1',1",1"', is embedded in fluid polymer material 2, i.e. in polymer material that is in fluid form. In said embedding, fluid polymer material 2, in particular a uniform body of thereof, is guided to wet all the composite members 1,1',1",1"'. Thus, the fluid polymer material 2 gets into contact with the outer surface of all the composite members and will be able to bond with them. The polymer material 2 is preferably guided to wet the entire outer circumference of all the composite members 1,1',1",1"', whereby in the final product the composite members will be individually surrounded (in transverse direction) by polymer material 2 bonded thereto.

In the implementation illustrated in FIG. 2, the embedding is performed by extruding with an extruding device 30. For this purpose, the row r,r',r",r"' is with continuous movement guided from the plasma treatment station P in the longitudinal direction thereof past an embedding station E, in particular an extrusion device 30 positioned at a stationary location and applying fluid polymer material on the composite members. In said extruding, the fluid polymer material 2 is extruded on the outer surface of the composite members 1,1',1",1"' such that the fluid polymer material 2 surrounds (in transverse direction) each of the composite members 1,1',1",1"' individually and fills each space s that exist in width direction W of the row between adjacent composite members 1,1',1",1"'. Thus, in the final product the composite members will be individually surrounded (in transverse direction) by polymer material bonded thereto and bound to each other by uniform body of polymer material between them.

So as to make permanent the relative position of the composite members 1,1',1",1"' in which they are arranged in said arranging, the fluid polymer material 2 is solidified after said embedding. The solidifying can be arranged in numerous different ways, such as by changing the temperature of the polymer material in fluid form to a temperature where the polymer material 2 in fluid form solidifies. In the method, after said arranging of the composite members 1,1',1",1"' to form an elongated row r,r',r",r"', the position of the composite members 1,1',1",1"' relative to each other is not allowed to change but maintained the same until the step of solidifying the polymer material 2 in fluid form is finished, whereafter the solidified polymer material 2 is itself able to maintain the relative position of the composite members 1,1',1",1"' the same. The relative position can be maintained between said arranging and solidifying for example by keeping the row under tension and guiding it with rollers. The rollers can be used to ground the composite members 1,1',1",1"' when necessary to get the proper electrical state for the composite members 1,1',1",1"'.

In the implementation showed in FIG. 2, in the embedding phase the polymer material 2 and the row, i.e. polymer material 2 and the composite members 1,1',1",1"', are forced together into a die 40, which forms the polymer material 2 into a desired shape. This is done by moving the polymer material 2 and the row r,r',r",r"' in longitudinal direction of the row r,r',r",r"' into an opening of the die 40 and through it with continuous process.

Prior to said embedding, the fluid polymer material 2 must be provided. In the preferred embodiment, the method comprises before said embedding providing thermoplastic polymer material 2' in solid form, preferably in the form of granules as illustrated in the hopper of FIG. 2, and thereafter raising the temperature of the solid polymer material 2' such that it gets into fluid form. The raising of the temperature is carried out in the embodiment of FIG. 2 within an extruding device, e.g. by electrical heating elements 31 integrated into the extruding device 30. Thus, the solid polymer material 2' is brought by heating into fluid form wherein it can be applied on the composite members and forced into a die 40, which modifies the outer shape of the polymer material 2 into a desired shape. In this embodiment, where the material is thermoplastic, said solidifying preferably comprises cooling off the thermoplastic polymer material 2, wherein the composite members are embedded.

The cooling off the polymer material 2 can be done for example within the die 40 after the polymer material 2 and the composite members 1,1',1",1''' have entered the die 40 and adopted an outer shape corresponding to inner shape of the die. The polymer material 2 can additionally or alternatively be cooled off by exposing the polymer material 2 to air or other gaseous fluid having temperature substantially lower than the heated polymer material 2, e.g. ambient air.

Most preferably, the polymer material 2 in fluid form comprises polyurethane or more specifically polyurethane resin material which forms solid polyurethane when solidified. Polyurethane is advantageous as it provides properties which are well suitable for elevators due to its good properties in terms of friction, elasticity and endurance of wear.

As mentioned, it is preferable that the polymer material 2 is thermoplastic. However, this is not necessary, because the polymer material 2 may alternatively be thermosetting. In that case, the process is modified such that the solidifying comprises instead of said cooling off a step wherein the fluid polymer material is cured, which curing may comprise heating the polymer material 2 over a curing temperature or treating it with a curing agent.

FIGS. 3 to 6, each disclose further details of the plasma treatment with different cross sections of the composite members 1,1',1",1''', as viewed along section B-B of FIG. 2. In said directing, plasma treatment is directed on opposite sides of the row r,r',r",r''' facing in thickness direction T of the row, i.e. on the sides extending in width direction of the row r,r',r",r'''. As illustrated, the plasma treatment is directed by plasma treating devices 20 located on opposite wide sides of the row r,r',r",r'''. As a result, the sides of the composite members 1,1',1",1''' which sides face in thickness direction of the row r,r',r",r''', and thereby also towards the plasma treating devices 20, are effectively treated. However, due to nature of the plasma treatment, also the sides forming flanks of the composite member 1,1',1",1''' and facing in width direction of the row r,r',r",r''', get also treated. The arrows drawn in FIGS. 3-6 represent how the treatment passes and gets distributed from the plasma treating devices on the composite members 1,1',1",1'''.

The composite members 1,1',1",1''' are shaped to be substantially larger in width direction W of the row r,r',r",r''' than in thickness direction T. Thus, each composite member 1,1',1",1''' has a width we substantially larger than thickness tc thereof, as measured in transverse direction of the row r,r',r",r'''. Each composite member 1,1',1",1''' has two opposing 'wide' sides facing in thickness direction of the row r,r',r",r''', and two opposing 'narrow' sides forming flanks and facing in width direction of the row r,r',r",r'''. As illustrated, the sides need not be smooth.

In the preferred embodiments, said flanks are convex-shaped. This is advantageous, because a convex-shaped surface is reached by the plasma treatment effectively when the plasma treatment comes from the thickness-directional side of the row. Particularly, plasma treatment reaches the flanks of the composite members more efficiently compared to arrangement where the composite members are rectangular. This is because with rectancular composite members each flank has a large surface area, which is substantially parallel with the direction of the plasma treatment. The problem is particularly present in the presented cases, where the composite members are spaced apart from each other in width direction W of the row r,r',r",r''', and treatment is intended to be directed also on the flanks adjacent of the composite members 1,1',1",1''' which flanks face each other.

This is important particularly when the polymer material 2 is to be guided to surround (in transverse direction) each of said composite members 1,1',1",1''' individually and to fill spaces (s) that exist in width direction W of the row between adjacent composite members 1,1',1",1'''. By shaping the composite members as described, the amount of plasma treatment ending up on the flanks can be increased and thereby bonding and consequently also adhesion between the polymer material 2 and the flanks of the composite members can be improved. Thus, the adhesion in these locations can be improved, which is desirable so as to achieve a very long life time for the rope or to increase force transmission ability of the rope or to increase the tolerance for abnormalities or local wear or to reduce of rope damage. So as to improve plasma treatment particularly with flanks facing each other, it may not be necessary that the outermost flanks of the outermost composite members are convex-shaped. The convex-shaped flanks are in FIGS. 1a and 1c arc-shaped and in FIGS. 1b and 1d V-shaped. These forms have proven to provide good results in plasma treatment. In FIGS. 1c and 1d, the opposing faces of the composite members 1",1''' which face in thickness direction T of the composite members 1",1''' and the row r",r''' are uneven, in particular having grooves, and convex shaped portions pointing in thickness direction of the composite members and the row. Uneven surface, and the surface particularly being in this way shaped, receives effectively plasma treatment whereby the bonding strength between the polymer material 2 and the composite member 1",1''' an be maximized.

The convex-shape is more specifically such that it has a tip p,p',p",p''' pointing in width direction W of the composite member 1,1',1",1''' and the row r,r',r",r'''. The convex shape has a tapering form with flanks that are inclined towards the tip p,p',p",p''', which connects the flanks. FIGS. 3 to 6 disclose alternative shapes for the composite members 1,1', 1",1'''. In each of these shapes, the tip p,p',p",p''' is located centrally in thickness direction of the composite member 1,1',1",1''' and the row r,r',r",r'''. This is advantageous as substantially similar amount of plasma treatment is directed from both thickness directional sides of the row r,r',r",r'''.

In general, the tip p,p',p",p''' connects the flanks that are inclined towards the tip p,p',p",p'''. The tip p,p',p",p''' is in size at most, preferably less than, ¼ of the thickness of the composite member 1,1',1",1''' and the row r,r',r",r''' as measured in said thickness direction T. In particular, the tip is to be formed pointy and with no flat end surface extending in thickness direction or at least with no flat end surface extending in thickness direction which in size more than ¼ of the thickness of the composite member as measured in thickness direction, as is the case with the tips p,p',p",p''' showed in FIGS. 3 to 6.

As above mentioned, the plasma treatment may, for example, take the form of any known plasma treatment for modifying the surface properties of a substrate (in this case the substrate is the row of composite members 1,1',1",1'''). Different plasma treatments for modifying the surface properties of a substrate are known in prior art. One preferred alternative is that said plasma treatment is in the form of corona discharge plasma treatment, which is a well-known treatment as such, and used e.g. in treating surfaces on which printing ink is to be applied. In this case, said plasma treatment device 20 is a corona discharge device. Corona discharge plasma treatment is often also referred to as air plasma.

The plasma treatment can alternatively be of any other kind of plasma treatment known for modifying the surface properties of a substrate, such as flame plasma treatment, athmospheric plasma treatment, chemical plasma treatment, RF-plasma treatment or microwave-plasma treatment. The plasma treatment can be in the cathegory of cold plasma or hot plasma, for instance.

It is possible, depending on the type of plasma chosen to be used, that said plasma treatment is such that it comprises using a plasma treatment device 20 comprising a high voltage electrode for ionizing gaseous substance(s) adjacent the substrate (in this case the row of composite members 1,1',1",1''') said substance(s) being particularly gaseous substance(s) between the electrode of the plasma treatment device 20 and the substrate (i.e. the row of composite members 1,1',1",1''') and/or for accelerating electrons towards (and particularly into) the surfaces of the composite members 1,1',1",1'''. Said ionizing and/or accelerating occurs typically for instance when the plasma treatment is in the form of corona discharge treatment. However, same effect may be possible to obtain with alternative forms of plasma treatments listed above.

With the method a rope R,R',R",R''' is manufactured, which comprises composite members 1,1',1",1''' each of which is elongated in the longitudinal direction of the rope R,R',R",R''' and continues unbroken throughout the length of the rope R,R',R",R''', said composite members 1,1',1",1''' being embedded in solid polymer material 2, and forming load bearing members of the rope R,R',R",R'''. FIGS. 8a to 8d illustrate the rope R,R',R",R''' manufactured with the method.

FIG. 7 illustrates a preferred inner structure of the composite member 1,1',1",1''', showing in particular the cross section of the composite member 1,1',1",1''' as viewed in the longitudinal direction L of the composite member 1,1',1",1'''. As mentioned, the composite member 1,1',1",1''' is made of composite material comprising reinforcing fibers f embedded in polymeric matrix m. The composite members 1,1', 1",1''' are in this case such that the polymer matrix m forms at least part of the outer surface of the composite member 1,1',1",1'''. In the method, the plasma treatment is directed on the polymer matrix m forming at least part of the outer surface of the composite members. The outer surfaces of the composite members treated by the plasma treatment may further be partially formed of some of the outermost reinforcing fibers f of the composite member 1,1',1",1''', which reinforcing fibers f may have parts of them extending such that they form part of said outer surface. In this case, the plasma treatment is directed also on those parts of the reinforcing fibers f. The reinforcing fibers are preferably carbon fibers. In the following further preferred details for the composite members are explained.

Each composite member 1,1',1",1''' is an elongated rodlike piece wherein the fibers f are parallel with the longitudinal direction of the composite member 1,1',1",1''', and thereby parallel with the longitudinal direction of the row r,r',r",r''' as well as the rope R,R',R",R''' being manufactured as each composite member 1,1',1",1''' is oriented parallel with the longitudinal direction of the row r,r',r",r''' as well as the rope R,R',R",R''' being manufactured. Thereby, the fibers in the final rope R,R',R",R''' will be aligned with the force when the rope R,R',R",R''' is pulled, which ensures that the structure provides high tensile stiffness. The fibers f used in the preferred embodiments are substantially untwisted in relation to each other, which provides them said orientation parallel with the longitudinal direction of the rope R,R',R", R''' being manufactured. This is in contrast to the conventionally twisted elevator ropes, where the wires or fibers are strongly twisted and have normally a twisting angle from 15 up to 30 degrees, the fiber/wire bundles of these conventionally twisted elevator ropes thereby having the potential for transforming towards a straighter configuration under tension, which provides these ropes a high elongation under tension.

The composite member 1,1',1",1''', as well as its fibers f are parallel with the longitudinal direction the rope, and untwisted as far as possible. Individual reinforcing fibers f are bound into a uniform composite member with the polymer matrix m. Thus, each composite member 1,1',1",1''' is one solid elongated rodlike piece. The reinforcing fibers f are preferably long continuous fibers in the longitudinal direction of the composite member, the fibers f preferably continuing for the whole length of the composite member 1,1',1",1''' as well as the rope R,R',R",R''' being manufactured. Preferably as many fibers f as possible, most preferably substantially all the fibers f of the composite member 1,1',1",1''' are oriented parallel with longitudinal direction of the rope R,R',R",R''' being manufactured, as far as possible in untwisted manner in relation to each other. Thus the structure of the composite member 1,1',1",1''' can be made to continue the same as far as possible in terms of its cross-section for the whole length of the rope. The reinforcing fibers f are preferably distributed in the aforementioned composite member 1,1',1",1''' substantially evenly, in particular as evenly as possible, so that the composite member 1,1',1",1''' would be as homogeneous as possible in the transverse direction thereof. An advantage of the structure presented is that the matrix m surrounding the reinforcing fibers f keeps the interpositioning of the reinforcing fibers f substantially unchanged. It equalizes with its slight elasticity the distribution of a force exerted on the fibers, reduces fiber-fiber contacts and internal wear of the rope, thus improving the service life of the rope. The composite matrix m, into which the individual fibers f are distributed as evenly as possible, is most preferably made of epoxy, which has good adhesiveness to the reinforcement fibers f and which is known to behave advantageously with carbon fiber. Alternatively, e.g. polyester or vinyl ester can be used, but alternatively any other suitable alternative materials can be used. FIG. 7 presents a partial cross-section of the composite member 1,1',1",1''' close to the surface thereof as viewed in the longitudinal direction of the rope presented inside the circle in the figure, according to which cross-section the reinforcing fibers f of the composite members 1,1',1",1''' are preferably organized in the polymer matrix m. The rest (parts not showed) of the composite member 1,1',1",1''' have a similar structure. FIG. 7 presents also how the individual reinforcing fibers f are substantially evenly distributed in the polymer matrix m, which surrounds the fibers and which is fixed to the fibers f. The polymer matrix m fills the areas between individual reinforcing fibers f and binds substantially all the reinforcing fibers f that are inside the matrix m to each other as a uniform solid substance. A chemical bond exists between, preferably all, the individual reinforcing fibers f and the matrix m, one advantage of which is uniformity of the structure. To strengthen the chemical bond, there can be, but not necessarily, a coating (not presented) of the actual fibers between the reinforcing fibers and the polymer matrix m. The polymer matrix m is of the kind described elsewhere in this application and can thus comprise additives for fine-tuning the properties of the matrix as an addition to the base polymer. The polymer matrix m is preferably, but not necessarily, of a hard non-elastomer. The reinforcing fibers f being in the polymer matrix means here that the individual reinforcing fibers are bound to each other with a polymer matrix m, e.g. in the manufacturing phase by immersing them together in the fluid material of the polymer matrix. In this case the gaps of individual reinforcing fibers bound to each other with the polymer matrix comprise the polymer of the matrix. In this way a great number of reinforcing fibers bound to each other in the longitudinal direction of the rope are distributed in the polymer matrix. The reinforcing fibers are preferably distributed substantially evenly in the polymer matrix such that the composite member is as homogeneous as possible when viewed in the direction of the cross-section of the rope. In other words, the fiber density in the cross-section of the composite member does not therefore vary substantially. The reinforcing fibers f together with the matrix m form a uniform composite member, inside which abrasive relative movement does not occur when the rope is bent. The individual reinforcing fibers of the composite member 1,1',1",1"' are mainly surrounded with polymer matrix m, but random fiber-fiber contacts can occur because controlling the position of the fibers in relation to each other in their simultaneous impregnation with polymer is difficult, and on the other hand, perfect elimination of random fiber-fiber contacts is not necessary from the viewpoint of the functioning of the invention. If, however, it is desired to reduce their random occurrence, the individual reinforcing fibers f can be pre-coated such that a polymer coating is around them already before the binding of individual reinforcing fibers to each other with the matrix m. In the invention the individual reinforcing fibers f of the composite member 1,1',1",1"' can comprise material of the polymer matrix around them such that the polymer matrix is immediately against the reinforcing fiber but alternatively a thin coating, e.g. a primer arranged on the surface of the reinforcing fiber in the manufacturing phase to improve chemical adhesion to the matrix material, can be in between. Individual reinforcing fibers f are distributed evenly in the composite member 1,1',1",1"' such that the gaps between individual reinforcing fibers f are filled with the polymer of the matrix m. Most preferably the majority, preferably substantially all of the gaps of the individual reinforcing fibers f in the composite member 1,1',1",1"' are filled with the polymer of the matrix m. As above mentioned, the matrix m of the composite member 1,1',1",1"' is most preferably hard in its material properties. A hard matrix m helps to support the reinforcing fibers f, especially when the rope bends, preventing buckling of the reinforcing fibers f of the bent rope, because the hard material supports the fibers f. To reduce the buckling and to facilitate a small bending radius of the rope, among other things, it is therefore preferred that the polymer matrix m is hard, and in particular non-elastomeric. The most preferred materials for the matrix are epoxy resin, polyester, phenolic plastic or vinyl ester. The polymer matrix m is preferably so hard that its module of elasticity (E) is over 2 GPa, most preferably over 2.5 GPa. In this case the module of elasticity (E) is preferably in the range 2.5-10 GPa, most preferably in the range 2.5-3.5 GPa. There are commercially available various material alternatives for the matrix m which can provide these material properties. Preferably over 50% of the surface area of the cross-section of the composite member 1,1',1",1"' is of the aforementioned reinforcing fiber, preferably such that 50%-80% is of the aforementioned reinforcing fiber, more preferably such that 55%-70% is of the aforementioned reinforcing fiber, and substantially all the remaining surface area is of polymer matrix. Most preferably, this is carried out such that approx. 60% of the surface area is of reinforcing fiber and approx. 40% is of matrix material (preferably epoxy material). In this way a good longitudinal stiffness for the composite member 1,1', 1",1"' is achieved. As mentioned carbon fiber is the most preferred fiber to be used as said reinforcing fiber due to its excellent properties. However, this is not necessary as alternative fibers could be used, such as glass fiber, which has been found to be suitable for the hoisting rope as well.

As mentioned, ropes R,R',R",R"' manufactured with the method are illustrated in FIGS. 8a to 8d. The rope R,R',R", R"' comprises composite members 1,1',1",1"' each of which is elongated in the longitudinal direction of the rope R,R', R",R"' and continues unbroken throughout the length of the rope R,R',R",R"', said composite members 1,1',1",1"' being embedded in solid polymer material 2, and forming load bearing members of the rope R,R',R",R"'. The composite members 1,1',1",1"' are parallel with each other as well as with the longitudinal rope R,R',R",R"'. The polymer material 2 surrounds each of said composite members 1,1',1",1"' individually and fills spaces s that exist in width direction W of the row between adjacent composite members 1,1',1",1"', thereby forming a common coating for all of the composite members and isolating these from each other.

Figure 9:
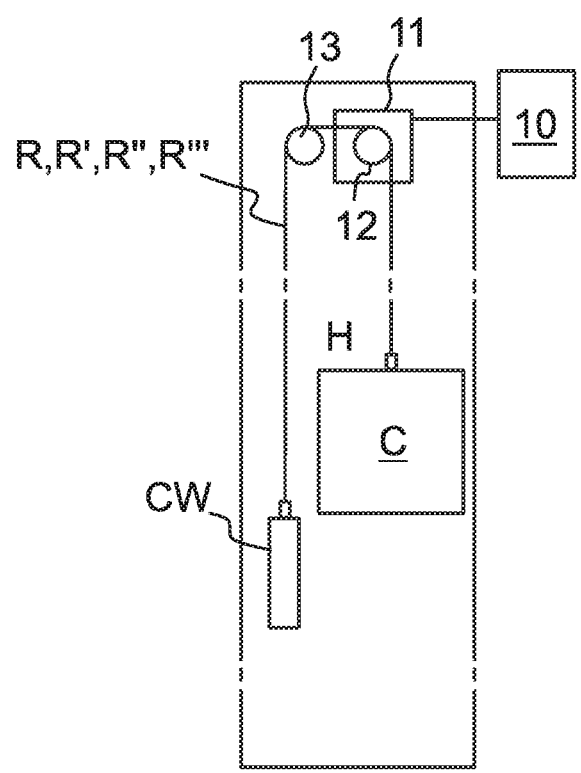
FIG. 9 illustrates schematically an elevator according to an embodiment of the invention as viewed from the side The foregoing aspects, features and advantages of the invention will be apparent from the drawings and the detailed description related thereto.

FIG. 9 illustrates an elevator, which comprises an elevator car C, a hoistway H, vertically movable in the hoistway H, and one or more hoisting ropes R,R',R",R"' connected with the elevator car C and suspending the car C. The one or more hoisting ropes R,R',R",R"' are each manufactured with the method described above. The elevator further comprises a counterweight CW vertically movable in the hoistway H, said one or more hoisting ropes R,R',R",R"' interconnecting the elevator car C and counterweight CW.

The elevator comprises one or more upper rope wheels 12,13 mounted higher than the car C and the counterweight CW, in particular in proximity of the upper end of the hoistway H. In this case there are two of said rope wheels 12,13. Each of said one or more ropes R,R',R",R"' pass around said one or more rope wheels 12, 13 mounted in proximity of the upper end of the hoistway H. Said one or more rope wheels 12, 13 comprise a drive wheel 12 engaging said one or more ropes R,R',R",R"'; and the elevator comprises a motor 11 for rotating the drive wheel 12. Thus, the elevator car C can be moved. The elevator further comprises an elevator control unit 10 for automatically controlling rotation of the motor 11. Thereby also the movement of the car 1 is automatically controllable. Each rope R,R',R",R"' of the elevator is preferably substantially larger in its width direction W than in its thickness direction T, i.e. it has width WR larger than thickness thereof. Thereby, the row of composite members, which resist bending due to the specific material and structure, is easier to bend around rope wheels 12,13. Alternative cross-sections of the ropes are illustrated in FIGS. 8a to 8d. So as to facilitate rope bending, the ropes R,R',R",R"' are arranged such that each of said one or more ropes R,R',R",R"' passes around the one or more rope wheels 12, 13 the side thereof which faces in thickness direction and extends in width direction of the of the rope R,R',R",R"', resting against the rope wheel 12, 13. Each rope passes around the one or more rope wheels 12, 13 turning around an axis extending in width direction W of the rope. The reinforcing fibers f of the composite members are preferably carbon fibers, which are light-weighted and possess excellent load-bearing ability in longitudinal direction. Thereby the elevator has excellent properties in terms of lifting capacity and energy-efficiency.

In the application only elevator has been presented as a hoisting apparatus utilizing the hoisting rope R,R',R",R"'. However, the hoisting rope R,R',R",R"' could be utilized in some other type of hoisting apparatus, such as a crane.

It is to be understood that the plasma treating devices 20 could alternatively be positioned in other ways than showed in the Figures. In FIGS. 2 to 6, the plasma treating devices 20 are located on opposite wide sides of the row r,r',r",r'", and opposite each other. However, this is not necessary as the plasma treating devices 20 could alternatively be located on opposite wide sides of the row r,r',r",r'", but not opposite each other. Then, the plasma treating devices 20 would preferably be positioned at a distance from each other as measured along the length of the row. Thereby, it can be ensured that the devices located on opposite wide sides of the row r,r',r",r'" do not disturb each other. It is also to be understood that the advantages of the invention can be obtained at least partially even though there would be some other number of said plasma treating devices 20, such as only one of them. It is also to be understood that the advantages of the invention can be obtained at least partially even though the plasma treatment is directed on the outer surface of the composite members from only one thickness-directional side of the row r,r',r",r'".

It is to be understood that in addition to what is described, it is possible to use special gases or other additional aids to enhance the plasma process disclosed.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims and their equivalents.

The invention claimed is:

1. A method for manufacturing a hoisting rope, the method comprising:
   providing a plurality of elongated composite members, each elongated composite member of the plurality of elongated composite members including a composite material, the composite material including reinforcing fibers embedded in a polymer matrix;
   arranging the plurality of elongated composite members to form an elongated row of parallel composite members such that the elongated row of parallel composite members includes the plurality of elongated composite members, the elongated row of parallel composite members having a longitudinal direction, a thickness direction and a width direction, wherein, in the elongated row of parallel composite members, the plurality of elongated composite members positioned side by side in the width direction such that the plurality of elongated composite members extend in parallel in the longitudinal direction of the elongated row of parallel composite members and are spaced apart at a particular distance in the width direction of the elongated row of parallel composite members, wherein
      each elongated composite member of the plurality of elongated composite members is substantially larger in the width direction of the elongated row of parallel composite members than in the thickness direction of the elongated row of parallel composite members and includes
         two opposite sides facing in the thickness direction of the elongated row of parallel composite members, and
         two opposite sides forming flanks facing in the width direction of the elongated row of parallel composite members, and
      each flank of said each elongated composite member of the plurality of elongated composite members has a convex shape,
      wherein the arranging of the plurality of the elongated composite members to be positioned side by side in the width direction, is performed by guiding said each elongated composite member under tension;
   directing plasma treatment on the elongated row of parallel composite members and thereby on one or more outer surfaces of said each elongated composite member of the elongated row of parallel composite members while continuing the guiding to keep the elongated composite members spaced apart at the particular distance in the width direction;
   embedding the plurality of elongated composite members of the elongated row of parallel composite members in fluid polymer material while keeping the elongated composite members spaced apart at the particular distance in the width direction, subsequently to the directing the plasma treatment, to establish a product having the plurality of elongated composite members embedded in the fluid polymer material where the elongated composite members embedded in the fluid polymer material are positioned side by side with said each elongated composite member spaced apart at the particular distance in the width direction; and
   solidifying the fluid polymer material of the product to form the hoisting rope.

2. The method according to claim 1, wherein the embedding includes guiding the fluid polymer material to wet all said elongated composite members of the plurality of elongated composite members.

3. The method according to claim 1, wherein the embedding includes guiding the fluid polymer material to individually surround said each elongated composite member of the plurality of elongated composite members and to fill one or more spaces that are between said each elongated composite member of the plurality of elongated composite members in the width direction of the elongated row of parallel composite members.

4. The method according to claim 1, wherein the embedding includes extruding the fluid polymer material on the one or more outer surfaces of said each elongated composite member of the elongated row of parallel composite members.

5. The method according to claim 1, wherein the directing the plasma treatment includes directing the plasma treatment on said each elongated composite member of the plurality of elongated composite members from opposite sides in the thickness direction of the elongated row of parallel composite members.

6. The method according to claim 1, wherein
   the convex shape is a V-shape or an arc-shape.

7. The method according to claim 1, wherein the convex shape includes a tip pointing in the width direction of the elongated row of parallel composite members.

8. The method according to claim 7, wherein the convex shape includes
   a tapering form that includes the tip of the convex shape.

9. The method according to claim 8, wherein the tip of the convex shape has a size that is not more than ¼ of a thickness of said each elongated composite member as measured in the thickness direction of the elongated row of parallel composite members.

10. The method according to claim 1, wherein the plasma treatment is
  a corona discharge plasma treatment,
  a flame plasma treatment,
  an atmospheric plasma treatment,
  a chemical plasma treatment,
  an RF-plasma treatment,
  a microwave-plasma treatment,
  a cold plasma treatment, or
  a hot plasma treatment.

11. The method according to claim 1, wherein
  the plasma treatment is electrical, and
  the plasma treatment includes
    ionizing gaseous substances adjacent the elongated row of parallel composite members, and/or
    accelerating electrons towards the one or more outer surfaces of the plurality of elongated composite members.

12. The method according to claim 1, wherein the plasma treatment is a corona discharge treatment.

13. The method according to claim 1, wherein opposing tips of side-by-side elongated composite members of said each elongated composite member are at a distance of less than 5 mm from each other during said directing.

14. The method according to claim 1, wherein said reinforcing fibers are carbon fibers.

15. The method according to claim 1, wherein a width/thickness ratio of the hoisting rope is more than two.

16. The method according to claim 1, wherein a width/thickness ratio of said each elongated composite member of the plurality of elongated composite members is more than two.

17. The method according to claim 1, wherein a quantity of the elongated composite members of the plurality of elongated composite members is at least 3.

* * * * *